United States Patent
Gazan

[11] 3,898,063
[45] Aug. 5, 1975

[54] COMBINATION MUFFLER AND FILTER DEVICE

[76] Inventor: George A. Gazan, 29545 Minglewood Ct., Farmington, Mich. 48024

[22] Filed: Feb. 23, 1973

[21] Appl. No.: 335,077

[52] U.S. Cl. .................. 55/276; 55/310; 55/313; 55/412; 55/503; 55/512; 55/523; 55/529; 55/DIG. 30; 181/44; 210/131
[51] Int. Cl. ............................................. B01d 27/08
[58] Field of Search ........................... 55/210–213, 55/215, 276, 418, 411–412, 307, 308, 309, 312–314, 523, 503, 529, DIG. 30, 310, 512; 210/130–131; 181/42, 44, 45

[56] References Cited
UNITED STATES PATENTS

| 2,012,962 | 9/1935 | Hagar | 55/308 X |
|---|---|---|---|
| 2,016,541 | 10/1935 | Campbell | 55/312 X |
| 2,707,051 | 4/1955 | Mailhot et al. | 55/523 X |
| 2,840,183 | 6/1958 | George | 55/309 X |
| 3,002,870 | 10/1961 | Belgarde et al. | 55/503 UX |
| 3,018,841 | 1/1962 | Gerlich | 55/523 UX |
| 3,129,078 | 4/1964 | Hobbs | 55/DIG. 30 |
| 3,261,146 | 7/1966 | Malec | 55/417 X |
| 3,397,516 | 8/1968 | Kobnick | 55/313 |
| 3,516,231 | 6/1970 | George | 55/309 X |
| 3,623,295 | 11/1971 | Shriner | 55/DIG. 30 |
| 3,712,030 | 1/1973 | Priest | 55/213 |
| 3,783,590 | 1/1974 | Allen | 55/313 X |

FOREIGN PATENTS OR APPLICATIONS

| 600,223 | 6/1960 | Canada | 55/523 |

Primary Examiner—Frank W. Lutter
Assistant Examiner—Kathleen J. Prunner
Attorney, Agent, or Firm—Hugh L. Fisher

[57] ABSTRACT

A combined filter and muffler device has a pair of members adjustably threaded together with replaceable ceramic filter elements therein. Exit holes in one member are variable controlled by the other member telescoping on the one. A spring biases the replaceable filter element toward an inlet opening permitting the element to be moved by excessive pressure to a position allowing by-pass of the fluid. The other member may have a separate outlet to provide an in-line filter. The filter elements are designed to diffuse the air flow to aid in the noise reduction.

15 Claims, 8 Drawing Figures

COMBINATION MUFFLER AND FILTER DEVICE

This invention relates to a filtering and muffler device and more particularly to such a device that serves as an adjustable flow exhaust or inline filter and has replaceable filter elements.

The problem of treating fluids to remove either dirt or other impurities as well as noise, from operating devices, has been increased due to recent emphasis on air and noise pollution restrictions. Maximum noise levels are being set in many areas such as in air or hydraulic machines. The use of filtering devices to muffle sound as well as screening out dirt, requires compact efficient devices that either are readily cleaned or have low cost replacement elements. Where the operation of the machine is dependent on the back pressure of a fluid or on the rate of flow through an exhaust, the use of conventional muffler techniques and filters results either in large bulky devices which may be expensive to make and service or which may require additional safety devices to protect overloads on the machine. Attempts have been made to utilize sintered porous metal filter units such as powdered bronze but the bronze units are expensive to replace and cannot be reused by cleaning except by expensive methods.

It is therefore an object of this invention to provide a convertible muffler-filter unit that is both efficient and yet compact.

A further object is to provide a muffler unit that utilizes replaceable filter elements that are not only easy to replace but can be easily cleaned for reuse.

Still another object of the invention is to provide an exhaust muffler device that can easily be adjusted to control the rate of flow there through and thus control the speed of operation of an apparatus exhausting to the muffler.

A further object is to provide a muffler and filter that will automatically be by-passed if the unit becomes clogged and will provide a signal that the unit requires servicing.

These and other objects and advantages will be readily apparant from the following description and accompanying drawings in which.

The preferred embodiment of the invention includes a container device formed by a pair of threaded telescopic tubular members that form a chamber therein. One or more replaceable elements, preferably made of porous sintered ceramic material, are contained in the chamber. A first one of the tubular members is threaded to be connected to the exhaust of an air cylinder, hydraulic motor or combustion engine. This member forms the inlet to the device and the replaceable element or cartridge is spring biased toward a seat surrounding the inlet to normally force fluid, such as air or oil, to pass through the filter cartridge.

The first member has an externally threaded portion that has one or more outlet holes therein connecting the inside of the chamber adjacent to the filter cartridge to the exterior of the device. The second tubular member of the pair is internally threaded to be telescopically engageable over the externally threaded portion of the first member and to adjustably close off the outlet holes in the first member. The second member may either serve as a cap or closure requiring fluid to escape through the outlet holes or may have a bore therein connected to the chamber and which serves as an alternative outlet for fluid from the chamber.

The filter cartridge has an outer size that permits fluid flow between the elements and the interior of the container so that if the filter cartridge becomes clogged with dirt or other particles causing reduced flow therethrough, the cartridge will be moved by the resulting pressure buildup off the seat and fluid may flow around the filter cartridge.

Figure 1:
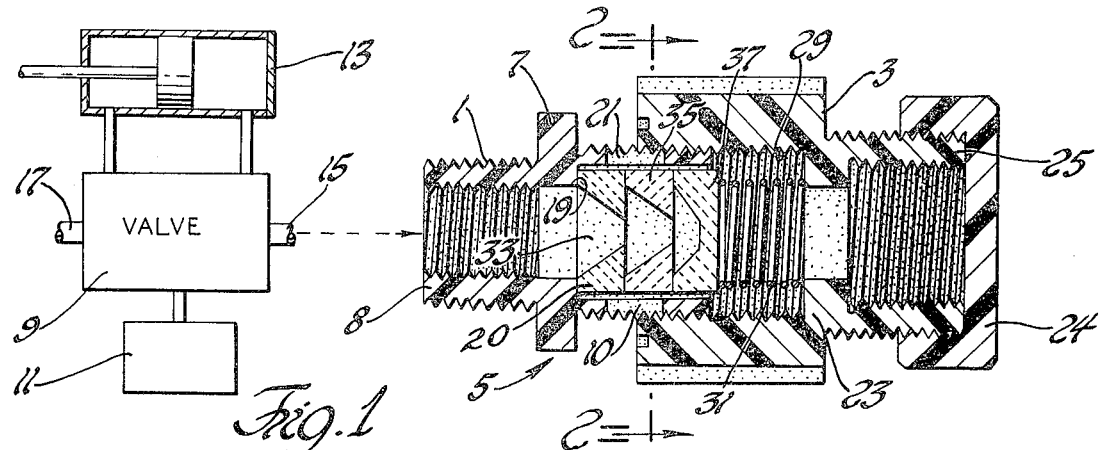
FIG. 1 is a cross sectional view of a combined muffler and filter device employing the invention.
Figure 2:
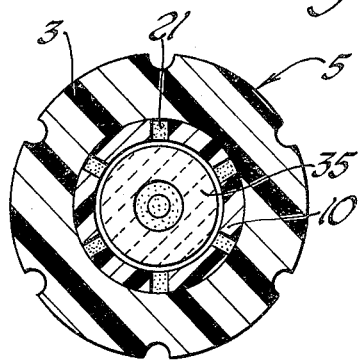
FIG. 2 is a cross section taken on the line 2—2 of FIG. 1.
Figure 8:
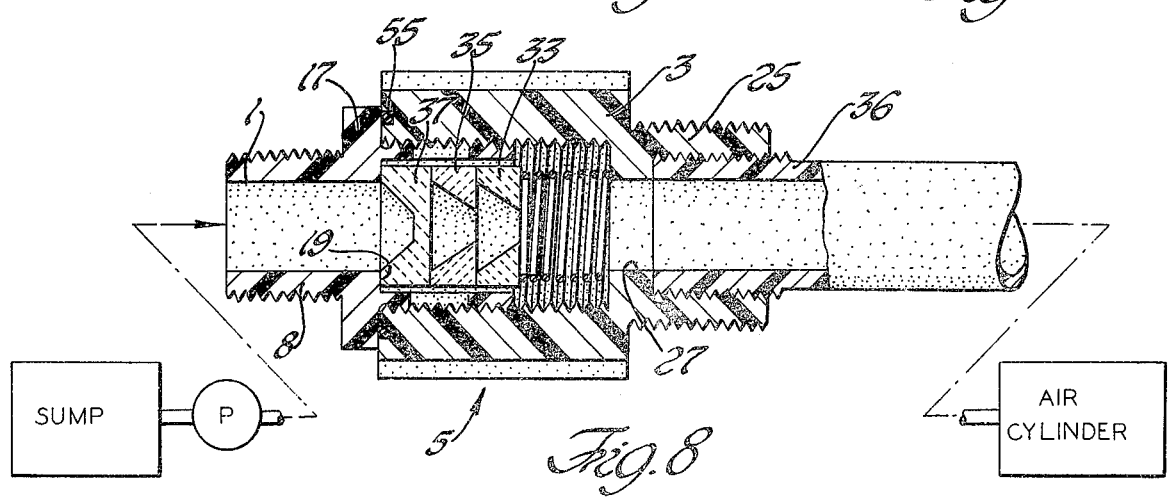
FIG. 8 is a cross sectional view of a non-muffler filter unit embodying the invention.

Referring now to the drawings, FIG. 1 illustrates the preferred embodiment when used as a muffler-filter device whereas FIG. 8 illustrates the same used solely as a filter device. The muffler-filter includes a pair of telescopically threaded housing members 1 and 3 forming an enclosed space or a container, generally indicated 5. These members may be made of any suitable material and made by any process. The preferred embodiment utilizes plastic molded parts made of nylon or Delrin or the like, for purposes to be described below.

The member 1 is tubular and includes a central large diameter flange portion 7 that may be hexagonal or otherwise shaped to permit holding the same against movement. The central flange 7 separates fluid inlet portion 8 and a filter receiving tubular portion 10. The inlet portion is threaded either externally, internally or both as shown, and is adapted to be connected to a pipe or other conduit connected to the exhaust of a fluid machine. FIG. 1 shows one application wherein a valve 9 controls flow of air from a fluid pressure source 11 to and from a cylinder unit 13. Exhaust part 15 is connected to the muffler-filter device. If the valve 9 is a conventional three-way valve the exhaust from either side of the cylinder passes through the part 15 while a four-way valve installation would include a second exhaust part 17. A second muffler-filter device may be connected to the exhaust part 17.

The filter receiving tubular portion 10 has an enlarged diameter interior forming a seat 19 against which a cartridge element 20 normally rests. The portion 10 is externally threaded and includes a plurality of outlets, openings, exit holes or slots 21. These holes may be round or elongated. They may also be staggered in location.

The second member 3 of the pair that constitute the container 5, may take the form of a cap or closure device as shown in FIG. 1 having an end wall 23. An externally and internally threaded extension 25 has a bore 27 and is closed by an internally threaded cap 24. The member 3 has an internally threaded portion 29 to engage the external threads on the portion 10 of the first member. The outer periphery of the member 3 is shaped to provide a gripping surface to enable turning of the member 3 relative to the member 1 to adjustably close the exit holes or ports 21 as shown in FIG. 1 thus the threaded portion 29 serves as a valve-like portion by controlling the size of the ports 21.

Figure 5:
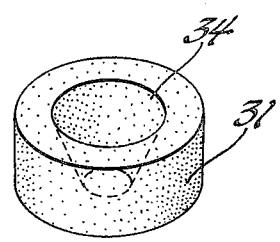
FIG. 5 is a perspective view of the filter element used in the embodiment of FIG. 2.

The interior side of the wall 23 serves as a seat for a resilient means, such as a coil spring 31 which acts against the filter cartridge 20. The filter cartridge 20 may take several forms and may consist of a single element or a series of coaxial elements as shown in FIG. 1. Two of the elements 33 and 35 are in the form of rings that have frusto-conical inner surfaces 34 as seen also in FIG. 5. The frusto-conical surfaces constitute means for causing a spinning or cyclonic action of fluid impacting the same and for changing the velocity of the fluid prior to its flow through the element. This provides added sound control.

The filter elements are preferrably made of sintered ceramic material having a controlled porosity. The ceramic elements can be made rather inexpensively and have the advantage over bronze elements of being reusable. The elements can be cleaned by the use of a torch burning out the collected foreign material. Such a cleaning process is not possible with bronze elements since they would be damaged by the intense heat needed to burn out the impurities.

In the FIG. 1 application the element 37 that is furtherest from the inlet is molded so as to not allow free passage of fluid therethrough thus forcing the fluid to pass through the walls of the elements. The outer diameter of the elements is smaller than the inner diameter of the tubular portion 10. Thus a clearance is provided which permits fluid flow between the outer periphery of the elements and portion 10. If the frusto-conical surfaces become covered or clogged with impurities such as oil or dirt particles, the flow through the elements is restricted causing a pressure build-up and an increasing force acting on the elements to move them against the spring 31. The spring 31 preferably has either a variable rate or multiple rates so as to provide a high initial force that must be overcome to cause initial movement of the filter elements from their seated position and will then permit movement to a full by-pass position allowing fluid to directly flow to outlet ports 21, and whereafter the spring will resist further movement. The spring 31 is preloaded by screwing the members 1 and 3 together. Because of restricted flow a distinctive sound is emitted as the fluid escapes, which sound is different than the normal sound and serves as an alarm to indicate that the filter is clogged.

When the muffler-filter is used in an application as shown in FIG. 1, the adjustment of the members 1 and 3 will provide a speed or variable control of the rate of movement of the piston in cylinder 13. Where the parts are made of nylon or delrin and a slight interference fit is provided in the threaded connection, the parts can be adjusted easily and at the same time will hold their respective positions. Where a second muffler device is provided to control the flow from the exhaust 17, such muffler can be adjusted to provide a different rate of flow and hence movement of the piston in one direction than in the other direction.

The center filter element 35 which is adjacent to the exit slots will have the fastest build-up of foreign material since there will be a greater flow therethrough. This element can be replaced without replacing the other elements. In any event the elements can be cleaned by burning out the impurities and reused for economy.

Figure 3:
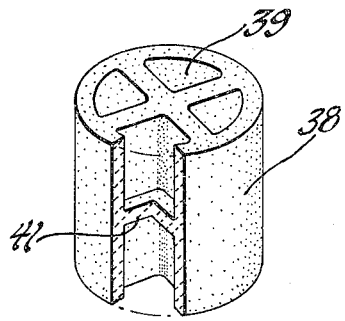
FIG. 3 is a perspective view of a modified form of filter element.

The filter cartridge may take the form of a single element. FIG. 3 illustrates a molded ceramic element 38 having four pie shaped apertures 39 and a central web 41. Again the fluid is broken by the dividing of the flow stream and a substantial sound absorbtion is obtained while permitting a relatively large fluid flow. Where the filter element 37 has been used in a muffler-filter application, as in FIG. 1, and the end of the element 38 facing inlet 8 becomes clogged, it can be removed and turned end for end to position the opposite end with new unclogged surfaces facing toward the inlet 8. The web 41 also serves as an exposed portion on which increased pressure due to particle build-up will act to move the element against the spring 31.

Figure 4:
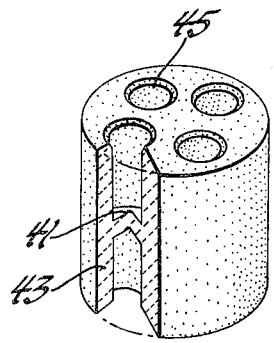
FIG. 4 is a perspective view of another modified form of filter element.
Figure 6:
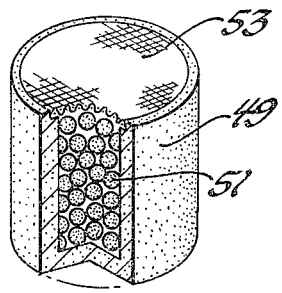
FIG. 6 is still another form of filter element.
Figure 7:
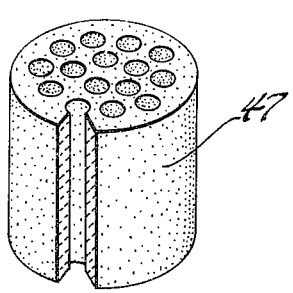
FIG. 7 is a fifth form of filter element.

FIGS. 4, 6 and 7 illustrate additional forms of filter elements. The element 43 of FIG. 4 is similar to the FIG. 3 element except that the apertures 45 are cylindrical rather than pie shaped. FIG. 7 shows an element 47 that has a larger number of holes that pass completely through the element. The element 49 of FIG. 6 is in the shape of a container filled with ceramic porous balls 51 and closed by a screen 53. The balls 51 have a combined diffusion and filtering effect on the fluid to reduce the velocity, absorb sound and filter foreign particles.

FIG. 8 illustrates a series type filter application of the invention with all of the parts being the same as that in FIG. 1 except that an O-ring 55 seals between the members 1 and 3 to prevent fluid loss therebetween. Also the element 37 is located closest to the inlet and requires all of the fluid to flow therethrough and then through elements 33 and 35 so that fluid may flow through bore 27 and into outlet conduit 36. The frusto-conical elements act to give the flowing fluid a swirl which aids in dampening pressure surges. Also the spring 31 will absorb energy so that the device of FIG. 8 not only serves as a filter, but as a snubber to prevent high pressure surges from reaching devices such as pressure gauges and damaging the same.

The filter arrangement can utilize two or three wafer elements 37 to provide a series of filters. Also the porosity of the elements can be differently graded so as to provide a stepped filtering action. Several of the devices of FIG. 8 can be inserted in series in a fluid line to provide additional filtering and sound control. In each case the same components can be used to provide different results. When the element 37 becomes clogged it will move off its seat permitting fluid to flow around the periphery of the elements in the clearance between the elements and the part 1. This provides the sound change that alerts the machine operator that service is required.

The device can easily be made into an in-line filtered check valve by inserting a ball between the seat 19 and element 37. In this case it may be desirable to chamfer the edge of the seat.

It is obvious that I have provided a simple device that is easy to manufacture, is usable for a variety of purposes, is adjustable over a considerable range and can be easily serviced to provide continued efficient action. The unit is compact and thus several can be used side by side as required in some gang valve installations. The unit is safe in that it prevents excessive pressure build-up and yet provides a signal when servicing is required.

Various modifications and changes will be readily apparent to those skilled in the art. For example, the internal and external thread relationship between the parts can be reversed and the exit ports rearranged in

I claim:

1. A combination particle and noise filter device including a pair of disengageable and manually adjustable housing members telescopically joined to form therebetween an enclosed space, fluid inlet means in one of the members connected to said space and adapted to be connected to a source of fluid under pressure, the fluid inlet means having a seat, fluid outlet means in one of the members connected to said space, the area of the fluid outlet means being variable by the manual adjustment of the telescopic joining of the housing members, removable ceramic porous cartridge means in said space located between said inlet and outlet means, and resilient means biasing said cartridge means to a position against said seat thereby requiring fluid from said inlet means to pass through said cartridge means in order to reach said outlet means, and thereby filtering both particles and noise from said fluid, said cartridge means having a surface exposed to pressure of said fluid whereby pressure buildup above a predetermined value due to decreased flow through the cartridge means caused by particle buildup and plugging of the cartridge means will cause said cartridge means to move against said resilient means to a position where at least a portion of said fluid can bypass said cartridge means and pass through a restricted flow area formed between said cartridge means and said housing members directly from said inlet means to said outlet means in a manner to cause an audible sound to warn that such bypass is occurring.

2. The device of claim 1 wherein said outlet means comprises a plurality of openings in one of said members and said other member is adjustably secured to said one member to variably close said outlet means thereby varying the rate of fluid flow through said device.

3. The device of claim 2 wherein the portion of fluid by-passing said cartridge means passes through the plurality of openings in a manner to cause an audible sound to be emitted to warn that such by-pass is occuring.

4. The device of claim 1 wherein said cartridge means comprises at least one porous ring element having a frustoconical inner surface exposed to fluid from said inlet means whereby fluid striking said surface will be deflected in a cyclonic manner to diffuse the flow and reduce velocity of the fluid prior to passing through the element.

5. The device of claim 4 wherein said cartridge means further comprises a coaxial series of said ring elements to multiply the effect of said diffusing reduction.

6. The device of claim 1 wherein said one member has an externally threaded tubular portion enclosing said cartridge means and said other member has an internally threaded tubular portion threaded on said externally threaded portion, said resilient means comprising a spring compressed between said cartridge means and said other member.

7. The device of claim 1 wherein said cartridge means comprises a cylindrical ceramic member having a plurality of relatively large longitudinally extending openings providing a relatively large internal surface area exposed to said fluid for passage of fluid through the walls of the ceramic member to the exterior thereof.

8. The device of claim 1 wherein said cartridge means comprises an open ended hollow cylindrical container filled with a plurality of porous balls therein and a perforated member closing said open end so as to retain the porous balls therein, the open end being positioned against the seat so as to be exposed to fluid from said inlet means, said balls providing a diffusing sound absorbing effect on said fluid.

9. The device of claim 1 wherein said cartridge means comprises a cylindrical ceramic member having a plurality of relatively large longitudinally extending openings provided with a web therebetween, the openings providing a relatively large internal surface area exposed to said fluid for passage of fluid through the walls of the ceramic member to the exterior thereof.

10. The device of claim 1 wherein said resilient means further comprises a spring having a plurality of rates and arranged so that a maximum force is first required to compress the spring so as to permit the by-pass.

11. The device of claim 1 wherein the members are made of a plastic-like material so as to provide an interference fit therebetween.

12. A combination particle and noise filter device including a pair of disengageable housing members forming therebetween an enclosed space, fluid inlet means in one of the members connected to said space and adapted to be connected to a source of fluid under pressure, the fluid inlet means having a seat, fluid outlet means in one of the members connected to said space, removable ceramic porous cartridge means in said space located between said inlet and outlet means, and resilient means biasing said cartridge means to a position against said seat thereby requiring fluid from said inlet means to pass through said cartridge means in order to reach said outlet means, and thereby filtering both particles and noise from said fluid, said cartridge means having a surface exposed to pressure of said fluid whereby pressure buildup above a predetermined value due to decreased flow through the cartridge means caused by particle buildup will cause said cartridge means to move from the seat against said resilient means to a position where at least a portion of said fluid can bypass said cartridge means and pass directly from said inlet means to said outlet means, said outlet means comprising a plurality of openings in one of said members and the other of said members is adjustably secured to said one member to variably close said outlet means thereby varying the rate of fluid flow through said device, said one member has an externally threaded tubular portion extending over said cartridge means, said tubular portion having said openings therein connecting said cartridge means with the exterior thereof, said other member having an internally threaded tubular portion threaded on the externally threaded portion on said one member, whereby adjustment of said members relative to each other will variably close said openings.

13. The device of claim 10 wherein said resilient means further comprises a spring having a plurality of rates so as to present a maximum initial resistance to movement of the cartridge means.

14. A combined filter and muffler device comprising a first tubular member having an inlet and threaded portion, and a plurality of exit openings extending radially from said member, a second tubular member having a threaded portion engaging said threaded portion of said first tubular member to form a telescopic connection therewith in such manner so as to vary the size of said exit openings upon manual adjustment of the telescopic connection of the members, an internal seat portion on said first member, a cartridge in said first tubular member, a spring member biasing said cartridge against said seat portion and reacting against said second tubular member.

15. The device of claim 14 wherein said cartridge comprises two or more coaxial porous cylindrical elements loosely fitting in said first tubular member with a clearance between the outer surface of the cylindrical elements and the inner surface of said first tubular member, at least one of the cylindrical elements having a frustoconical longitudinal opening therein providing a diffusion passage for the passage of fluid into the interior of said cylindrical elements and at least one of the cylindrical elements presenting a non-free flow surface facing toward said inlet.

* * * * *